Patented July 14, 1936

2,047,668

UNITED STATES PATENT OFFICE 2,047,668

SYNTHETIC RESINS

Merlin Martin Brubaker, Wilmington, Del., assignor to E. I. du Pont de Nemours & Company, Wilmington, Del., a corporation of Delaware No Drawing. Application March 21, 1932, Serial No. 600,367

8 Claims. (Cl. 260—8)

This invention relates to the preparation of new resins and resinous compositions, and more particularly to resins of the polyhydric alcohol-polybasic acid type.

This invention has as an object the preparation of new resins. A further object resides in a process for making these resins. Other objects will appear hereinafter.

These objects are accomplished by the following invention which consists in including with the reaction mixture of resin ingredients an organic compound containing a cyano group as will more fully appear hereinafter.

The preferred method of making my new resins is as follows: The apparatus consists of a vessel of suitable size, provided with a thermometer, sealed stirrer and reflux condenser. All of the resin ingredients, including the nitrile, are fused under the water-cooled reflux at 130–150° C. for about three hours, after which time the mixture usually becomes clear, as shown by a drop placed upon a glass plate. This point is reached sooner when aromatic nitriles are used as one of the resin ingredients (as compared to aliphatic nitriles). During this reflux period, some foaming and sputtering may be observed because of water being returned to the reaction vessel, especially when the reaction mixture comprises an organic acid. The presence of a small amount of water is necessary, however, to begin the hydrolysis of the nitrile. The water-cooled reflux condenser thus serves to retain in the early stages of the reaction sufficient water to begin this hydrolysis, and in addition serves to return unhydrolyzed nitrile to the reaction mixture if the particular nitrile used is volatile at the temperature of the reaction. After this initial refluxing period, the water-cooled condenser is replaced by a short air-cooled reflux and the temperature gradually raised to 190–200° C. The mixture is then heated and stirred at this point for 4–10 hours, the exact time and temperature depending upon nature and quantity of the nitrile. The resins so obtained are medium to dark in color, have a low acid index, and may be dissolved in such solvents as esters, ketones, terpene solvents, aromatic hydrocarbons, and in mixtures of aliphatic and aromatic hydrocarbons.

In making my new resins I usually prefer to employ the nitrile in conjunction with a polybasic acid. I have found that resins having excellent film characteristics are formed when this method of carrying out my invention is used and when certain modifying agents, such as drying oil acids, are included as resin ingredients in the reaction mixture for the purpose of imparting durability. The resins may, however, be made by reacting the polyhydric alcohol with a polybasic acid nitrile such as adipic nitrile in the absence of any acidic ingredient. In such cases, water should be added initially in quantity sufficient to begin the hydrolysis of the nitrile; the amount necessary is small and enough may be present as an impurity in the polyhydric alcohol. The carboxyl groups formed by hydrolysis of the cyano groups then unite with the hydroxyl groups of the polyhydric alcohol. Where both acids and alcohols, or a cyano-acid and alcohols, are present in the initial reaction mixture, the esterification reaction begins first, thus liberating water for the hydrolysis of the cyano group; therefore, no addition of water is necessary in such cases.

When no acids are used as resin ingredients (i. e. where the reaction mixture is a polybasic acid nitrile with or without a monobasic acid nitrile, and a polyhydric alcohol with or without a monohydric alcohol), practically no water is obtained as a by-product in the formation of the resin. When the reaction mixtre comprises one or more monobasic or polybasic acids in addition to the monobasic and/or polybasic acid nitrile, some water is obtained as a by-product inasmuch as that formed by esterification exceeds that necessary for the hydrolysis of the nitrile. The quantity is less, however, than that which would be formed if no nitrile were present. For resin formation, it is necessary that a polybasic acid and/or a polyhydric acid nitrile and/or a cyano-acid be present in the reaction mixture.

The following examples in which the parts are by weight are illustrative of the method of carrying out my invention:

Example I

Fifty-five and five-tenths (55.5) parts glycerol, 93.4 parts linseed oil acids, 37.4 parts China wood oil acids, 47.1 parts benzonitrile and 66.6 parts phthalic anhydride are placed in a vessel fitted with a sealed stirrer, thermometer, and water-cooled reflux condenser, and brought to a temperature of about 150° C. over a period of about 30 minutes. The mixture has a clear light color. Heating and stirring is continued for 2½ hours. At the end of this period, the water condenser is replaced by a short air-cooled reflux and the temperature gradually raised to 190–200° C., where it is held for seven hours. The resin has now assumed a rather dark color and has become viscous. The final acid number is about 15. This product may be thinned (preferably while hot) with the usual solvents. Films flowed from solutions tend to harden on exposure to air; this is aided by the presence of driers and/or by baking.

Example II

Seventy-eight and nine-tenths (78.9) parts glycerol, 266.8 parts linseed oil acids, 26.1 parts n-butyronitrile, and 128.2 parts phthalic anhydride are heated in the apparatus of Example I to 145–150° C. over a period of thirty minutes. The temperature is held at this point for 2½ hours. The mixture becomes clear after the first half hour. At the end of this preliminary refluxing period, the water condenser is replaced by a short air-cooled reflux as before. The temperature is now gradually raised to 185–200° C. and held in this range for 10 hours. The acid number of the final product is 14.4.

Example III

Fifty-one and two-tenths (51.2) parts of glycerol, 167.1 parts linseed oil acids, 11.9 parts succinonitrile, and 98.1 parts phthalic anhydride are heated in the usual apparatus for one hour at 150° C. The water-cooled reflux is then replaced by an air reflux, and the temperature raised gradually to 185–200° C. and held in this range for four hours. The final acid number is about 60.

Various modifications in procedure are possible. The ingredients may be heated together without a preliminary refluxing period, as when a high boiling nitrile is present in relatively small amount. The nitrile, if a liquid, may be added dropwise to the other ingredients which have been fused to the clear point. Nitriles having a low boiling point may be vaporized into the fused mixture of the remaining ingredients, either alone or admixed with an inert gas, such as nitrogen. My resins may also be made by heating the ingredients in an inert solvent for the resin, such as "Hi-flash" naphtha, provision being had for the removal of the water of reaction; details of this method are given in a co-pending application by M. M. Brubaker, Serial No. 421,585, filed January 17, 1930. If desired, the nitrile or mixture of nitrile and acid may be heated first to some temperature in the esterification range (150–250° C.) and the polyhydric alcohol added continuously or in small portions, with a continuation of the heating to resinification. Various catalysts, such as hydrochloric acid, sodium hydroxide and sodium carbonate, may be used to facilitate the hydrolysis of the nitrile.

The polyhydric alcohols and polybasic acids used in the present invention are those conventionally used in the manufacture of polyhydric alcohol-polybasic acid resins. Thus, as polybasic acids I may use, in addition to phthalic, such acids as adipic, succinic, maleic, dilactylic, citric, tartaric, chlorophthalic, diphenic, trimesic, and quinolinic. Among the polyhydric alcohols that may be used in addition to glycerol, there may be mentioned ethylene glycol, butylene glycol, diethylene glycol, triethanolamine, pentaerythritol, sorbitol, and alkyl and aryl ethers of polyhydric alcohols having at least two hydroxyl groups, such as monobenzylin and the diethyl ether of pentaerythritol.

The term nitrile as used herein has its customary meaning and implies any organic compound containing the monovalent —C≡N group (referred to as cyano), which on hydrolysis yields the corresponding acid. All kinds of these compounds may be used in the practice of the present invention. Thus, I may use aliphatic or aromatic nitriles, monobasic or polybasic acid nitriles, and compounds containing other organic radicals in addition to the cyano group. In addition to the nitriles mentioned in the examples, the following nitriles may be mentioned as useful in the practice of the present invention: monobasic acid nitriles such as acetonitrile, acrylic nitrile, myristonitrile, stearonitrile, toluic nitrile, and phenyl acetic nitrile, nitriles of polybasic acids such as adipic nitrile, glutaconic nitrile, p-dicyanobenzol and o-cyano benzyl cyanide; nitriles containing other functional groups in addition to the cyano group, such as chloroacetic and chlorobenzoic nitriles, lactic and mandelic nitriles and other aldehyde-hydrogen cyanide addition products, α-hydroxyisobutyronitrile and other ketone-hydrogen cyanide addition products, acetoacetic nitrile, dilactylic nitrile, aminoacetic and anthranilic nitriles, and cyanobutyric and cyanobenzoic acids. The last mentioned, namely the cyano-acids, are especially useful inasmuch as the carboxyl group is esterified by the alcoholic resin ingredients, furnishing water for the hydrolysis of the cyano group. For this reason, resins prepared from a polyhydric alcohol and a cyano-acid, no other acidic ingredients being present, do not require the presence of water to begin the hydrolysis of the cyano group, as would be the case with, for example, azelaic nitrile and a polyhydric alcohol.

Various modifying agents in addition to the nitriles, such as fatty oils, natural resins, monohydric alcohols, etc., may be included in the mixture of resin ingredients in order to impart certain desired characteristics to the resin. As specific examples of these modifying agents the following may be mentioned: linseed, China wood, and cottonseed oil mono- and/or diglycerides (or the equivalent esters obtained with other polyhydric alcohols), fatty oil acids, e. g., cottonseed oil acids, Perilla oil acids, and soya bean oil acids; castor oil; natural resins, resin acids and ester gums such as Congo, abietic acid, and rosin glyceride; monohydric alcohols such as amyl, benzyl, and cyclohexyl alcohols; monobasic acids such as butyric, stearic, oleic, benzoic, salicylic, and fatty oil acids, as mentioned above. When non-hydroxylated fatty oils, such as linseed oil and coconut oil, are used in making the resin, it is preferred to incorporate them into the resin by the alcoholysis process which consists in heating the oil with the polyhydric alcohol in the presence of a suitable catalyst, such as litharge or sodium hydroxide, until the two phases merge into a single phase and then heating this product with the remaining resin ingredients. While I usually prefer to include one or more of these modifying agents, I desire it to be understood that my new products may be made without them.

My new products can be used advantageously for many purposes: molding plastics; coating compositions; impregnating, glazing, or waterproofing agents for paper, cloth, wood pulp, and porous surfaces or bodies in general; adhesives for general use, in particular as binding agents for sheets of mica (insulation), cellulose acetate and other cellulose derivatives (laminated products) and glass (safety glass—either as the intermediate layer or layers or as adhesives therefor). For any of the above purposes, my resins can be combined by means of heating, mutual solvents, or by other means, with one or more of the following: cellulose derivatives, such as nitro-cellulose, cellulose acetopropionate, ethyl cellulose and benzyl cellulose; natural resins, such as rosin, Kauri, and Damar; semi-synthetic resins, such as ester gum, Congo glycolide, and ethyl abietate; drying oils, such as linseed and China wood oils; other synthetic resins, such as phenol-formaldehyde, amine-aldehyde, and vinyl; bitumens, such as asphalt. To my products, either alone or admixed with the above substances, I may add solvents, fillers, pigments, dyes, plasticizers, antioxidants, etc., as needed and desired as is conventional in the art.

The use of nitriles as an ingredient of polyhydric alcohol-polybasic acid resins as herein disclosed is advantageous because the nitrile reacts with all or a portion of the water formed as a by-product of the esterification reactions and thereby causes the resin to possess certain valuable characteristics not possessed by resins of this type in the preparation of which water is liberated. Water is normally a by-product of polyhydric alcohol-polybasic acid resin reactions inasmuch as these reactions are those of esterification. To carry out the reaction in completely closed systems is not feasible because it does not permit the escape of the water of reaction, which is necessary for resin formation. On the other hand, by using nitriles instead of acids, as disclosed herein, the water which is a by-product of esterification is wholly or partially used up in the hydrolysis of the nitrile to the acid which in turn reacts with the alcohol. By reason of the fact that my new resins may be made in closed systems, the resins are more useful for molding since they can be carried more readily to the infusible and insoluble stage under heat and pressure because of the absence, or diminished quantity, of water as a by-product as it is well understood that molded resins should be in the infusible and insoluble stage and must be molded while still fusible. When water is liberated during the hardening process, the transformation from the fusible to the infusible stage is retarded because of the reverse reaction induced by the presence of the water. On the other hand, when water is not a by-product of the reaction, or when the quantity of water formed is substantially reduced, the transformation from the fusible to the infusible stage under heat and pressure is effected or accelerated and the resin may be pressed into the desired shape while still fusible and then carried to the infusible stage while still in the mold by the continued application of heat and pressure.

The ammonia which is liberated on the hydrolysis of the nitrile assists in the reduction of the acid number of the resin. This is especially advantageous when the products are intended for use as coating compositions since film durability is known to be consistent with low acid number.

As many apparently widely different embodiments of this invention may be made without departing from the spirit and scope thereof, it is to be understood that I do not limit myself to the specific embodiments thereof except as defined in the following claims.

I claim:

1. A process which comprises heating to resinification ingredients comprising essentially a polyhydric alcohol and a polyfunctional component containing a cyano group, and adding water to the reaction mixture when the number of cyano groups in the polyfunctional component exceed the number of carboxyl groups therein, said polyfunctional component being selected from the class consisting of organic compounds having at least two cyano groups hydrolyzable to carboxyl, organic compounds having at least one cyano group hydrolyzable to carboxyl and at least one carboxyl group, and a mixture of a polycarboxylic acid and an organic compound having at least one cyano group hydrolyzable to carboxyl.

2. A process which comprises heating to resinification ingredients comprising essentially a polyhydric alcohol and an organic compound having at least two cyano groups hydrolyzable to carboxyl, and adding water to the reaction mixture.

3. A process which comprises heating to resinification ingredients comprising essentially glycerol and an organic compound having at least two cyano groups hydrolyzable to carboxyl and adding water to the reaction mixture.

4. A process which comprises heating to resinification ingredients comprising essentially a polyhydric alcohol, a polycarboxylic acid, and an organic compound containing at least one cyano group hydrolyzable to carboxyl.

5. A process which comprises heating to resinification a polyhydric alcohol, a polycarboxylic acid, a monocarboxylic acid, and an organic compound having at least one cyano group hydrolyzable to carboxyl.

6. A process which comprises heating to resinification glycerol, phthalic anhydride, linseed oil acids, and butyronitrile.

7. A process which comprises heating to resinification ingredients comprising essentially a polyhydric alcohol and an organic compound having one cyano group hydrolyzable to carboxyl and one carboxyl group.

8. A process which comprises heating to resinification ingredients comprising essentially glycerol and an organic compound having one cyano group hydrolyzable to carboxyl and one carboxyl group.

MERLIN MARTIN BRUBAKER.